Feb. 27, 1968   D. G. DREWRY ET AL   3,370,794
ANNULAR PLENUM NOZZLE FOR CONTROLLING TRAJECTORY OF ROCKETS
Filed Nov. 8, 1965

INVENTORS
DAVID G. DREWRY
HARRY D. HARMONING

BY Claude Funkhouser
ATTORNEY

3,370,794
ANNULAR PLENUM NOZZLE FOR CONTROLLING TRAJECTORY OF ROCKETS
David G. Drewry, Cumberland, Md., and Harry D. Harmoning, Andover, Mass., assignors, by mesne assignments, to the United States of America as represented by the Secretary of the Navy
Filed Nov. 8, 1965, Ser. No. 507,635
1 Claim. (Cl. 239—265.17)

ABSTRACT OF THE DISCLOSURE

A system for controlling the trajectory of rocket vehicles solely through the use of the rocket's propellant gases. An annular plenum chamber bypasses a portion of the propellant gases before they enter the exit nozzle and they are later injected into the exit nozzle to modulate the hot gases passing therethrough.

Figure 1:
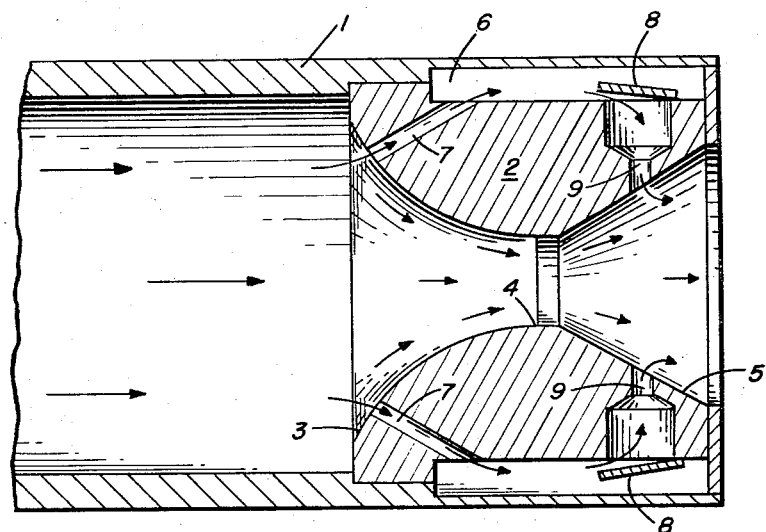

This invention relates to a system of thrust-vector control for rocket-propelled vehicles such as liquid or solid propellant missiles.

Heretofore, many methods of steering rocket vehicles have been proposed, none of which have proved entirely satisfactory or economically feasible due to their complexity. Such methods include the use of articulated shutters or flaps for deviating the rocket jet, auxiliary rockets, or jet vanes introduced into the exhaust flow from the reaction motor nozzle. These rocket steering systems required complex actuating means thereby adding critically to the weight and stability problems of the vehicle. Further, when the adjusting mechanisms become exposed to the high temperature of the exhaust gases they may become practically inoperable.

Means have also been proposed wherein a second rocket propellant of the low temperature type is housed near the rocket engine throat and ignited by the main rocket propellant to achieve thrust vector control. The inherent disadvantages of such a system lie with problems in storing and supplying the auxiliary propellant without additionally complicating weight and space factors.

With the present invention, the applicants avoid many of the problems inherent in the prior art rocket steering systems by eliminating the use of auxiliary attitude control components and secondary rocket propellants heretofore required. Accordingly, applicants accomplish trajectory control solely by utilizing the exhaust gases of reaction motors to alter the direction of the thrust of said gases to thereby control the attitude of the rocket vehicle.

In accordance with the present invention, a thrust vector control system is provided for either liquid or solid propellant rockets wherein propellant gases are bled-off or bypassed into an annular plenum surrounding the outside of the propulsion nozzle and thereafter bled-off from the plenum through hot gas valves and injected into the nozzle exit cone thereby creating oblique shock waves for modifying the direction and quantity of the exhaust gases flowing through the exit portion of the discharge nozzle. The desired modulation of the injected rate of flow is achieved by the proper actuation of the valve means. Thus extensive storage stability inherent in solid fuel rockets is not sacrificed for weighty attitude control actuating mechanisms normally required.

The annular plenum type exhaust nozzle design of the instant invention replaces the old type external ducting of propellant gases for achieving thrust vector control. Also, the plenum type design permits low approach gas velocity and reduces orientation of solid aluminum particles that exist when using an approach duct.

It is therefore an object of the present invention to provide an improved and simplified system for steering liquid and solid fuel rocket vehicles without the use of complex actuating means or additional control components.

Another object of the present invention is to provide a system for controlling the trajectory of rocket vehicles through the sole application of propellant gases wherein the gases are valved into the nozzle exit cone, yet does not require the usual external ducting or long flow passages.

Another object of the present invention is to provide a thrust vector control system for rockets wherein the propellant gases are bled from the main reaction chamber and subsequently injected into the nozzle exit cone for providing thrust vectoring solely by means of said propellant gases.

Figure 2:
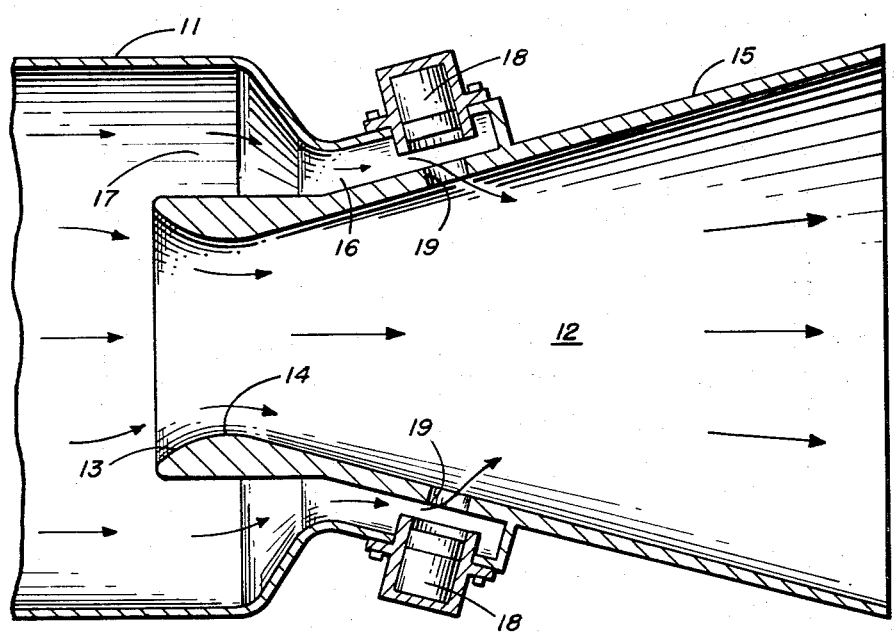

Other objects, advantages and novel features of the invention will become apparent from the following detailed description of the invention when considered in conjunction with the accompanying drawings wherein:

FIG. 1 is a fragmentary sectional view of the nozzle and aft end of a rocket engine in accordance with the present invention; and FIG. 2 is a sectional view of a modification embodying the present invention showing an angle valve with an annular plenum applied to the design of the aft end of a solid propellant rocket motor.

As shown in FIG. 1, the rocket engine shroud 1 encases at its aft end a discharge nozzle 2. The nozzle is of conventional design having a convergent or entrance cone portion 3, a throat portion 4, and a divergent or exit cone portion 5. A suitable propellant mixture, of a type commonly known by those skilled in the art, propels the vehicle by the thrust produced by exhaust gases emanating from the reaction motor discharging through the exhaust nozzle.

An annular plenum 6 surrounding the nozzle is defined by the nozzle outer surface and the inner surface of shroud 1 at the aft end of the rocket. The plenum is in direct communication at its upper end to the propulsive gases upstream of the nozzle by means of passages 7, capable of deviating a portion of said gases from the main body reaction chamber into plenum 6. Any suitable number of passages 7 may be provided along the convergent section of the nozzle. A series of equispaced injection ports 9 is provided aft of throat 4 in the divergent portion 5, each port being equipped with a hot gas valve 8 with appropriate control means, not shown, secured thereto, said means forming no part of this invention. The respective longitudinal axes of ports 9, such as, for example, six in number, can be either normal to the outer casing as shown or normal to the conical plane of the divergent section. The design of these ports must be capable of handling high temperature aluminized gas without appreciable erosion. A straight-through propellant gas valve-port made of phenolic resin and producing a convergent-divergent flow through the port 9 may be used, if so desired. After a portion of the exhaust gases emanating from the main reaction chamber into the gas discharge nozzle is bled off and channelled into the annular plenum 6, the flow of propellant gas is modulated through ports 9 by actuating gas valves 8 from a source forming no part of this invention.

As appears in the modification in FIG. 2, the annular plenum 16 is continuously open in an annular fashion at its upper end to the propulsive gases upstream of the nozzle. Exhaust nozzle 12 is formed integral with the reaction chamber. Plenum 16 in the modification is defined by casing 11 and an extension of diverging wall portion 15 whereby a streamline annular plenum nozzle is produced. The end of said extension defines an entrance cone portion 13 and a throat portion 14. In such a manner, articulated jet vanes and flaps normally employed at the throat section are obviated by means of the extension. Injection ports 19 are situated in the manner as described with reference to FIG. 1. Here, valves 18 may be of the solenoid type which, from a control source forming no part of the invention, can be actuated for a modulated flow of propellant gases through ports 19.

It should be appreciated that applicants have invented a simple and effective thrust vector control system without the usual external ducting or long gas flow passages, valve housings or additional propelling means heretofore required, thereby accomplishing a considerable weight reduction in effective hot gas injection thrust vectoring systems. The instant invention obviates the necessity of any movable components for effectuating thrust vector control leaving the design simple, economical and easy to manufacture.

Obviously many modifications and variations of the present invention are possible in the light of the above teachings. It is therefore to be understood that within the scope of the appended claim the invention may be practiced otherwise than as specifically described.

What is claimed is:

1. A system for the steering of rocket vehicles of the type propelled and steered solely by the thrust produced by exhaust gases emanating from a reaction motor and discharged through an exhaust nozzle within the rocket casing, said nozzle having a throat portion separating a converging entrance cone portion and a diverging exit cone portion, said system comprising:

an annular plenum defined by the inner surface of said rocket casing and a forward integral extension of said exit cone, said extension terminating in said entrance cone portion, and acting to bypass a portion of the gases from passing directly through the exit cone, said plenum being continuously open in an annular fashion at its upper end; and means between the plenum and the exit cone portion of the nozzle for injection of the bypassed gases into the exit cone whereby thrust vectoring control for steering said vehicle is accomplished solely by said injected gases.

References Cited
UNITED STATES PATENTS

| | | | |
|---|---|---|---|
| 3,036,430 | 5/1962 | Eggers et al. | 239—265.23 |
| 3,070,957 | 1/1963 | McCorkle | 239—127.3 |
| 3,092,963 | 6/1963 | Lawrence | 239—265.23 |
| 3,101,591 | 8/1963 | Wise | 239—265.23 |
| 3,279,185 | 10/1966 | Lewis et al. | 239—265.23 |
| 3,296,799 | 1/1967 | Fuentes | 239—265.23 |
| 3,303,654 | 2/1967 | Bringer | 239—265.23 |

EVERETT W. KIRBY, *Primary Examiner.*